United States Patent [19]

Ulm et al.

[11] 3,747,381

[45] July 24, 1973

[54] METHOD OF REMOVAL DEFORMATIONS FROM STORAGE TANK ROOF

[75] Inventors: Reign C. Ulm; Mark D. Kinghorn, both of Schererville, Ind.

[73] Assignee: Aerojet-General Corporation, El Monte, Calif.

[22] Filed: July 28, 1971

[21] Appl. No.: 166,986

Related U.S. Application Data

[62] Division of Ser. No. 45,165, June 10, 1970, Pat. No. 3,618,808.

[52] U.S. Cl. .......................... 72/54, 29/421, 220/1 B
[51] Int. Cl. ............................................. B21d 22/10
[58] Field of Search ................................. 72/54, 63; 113/116 QA; 254/93 R; 29/421

[56] References Cited
UNITED STATES PATENTS 3,355,052  11/1967  Kaups ................................. 220/18

1,716,947  6/1929  Boardman .......................... 220/1 B
3,315,343  4/1967  Berg .................................. 254/93 R Primary Examiner—Charles W. Lanham
Assistant Examiner—Robert M. Rogers
Attorney—D. Gordon Angus and Edward O. Ansell

[57] ABSTRACT

A method for removing deformations from a roof structure of a storage tank of the type wherein the roof is supported by vertical columns. The method comprises the steps of: (a) creating an upward force against the underside of the roof structure thereby increasing the length of the columns; and (b) removing the upward force while retaining the columns in their increased length. The apparatus provides a storage tank having a plurality of support columns adjustable in length and specific means to retain the columns in an increased length.

8 Claims, 8 Drawing Figures

PATENTED JUL 24 1973   3,747,381
SHEET 1 OF 2
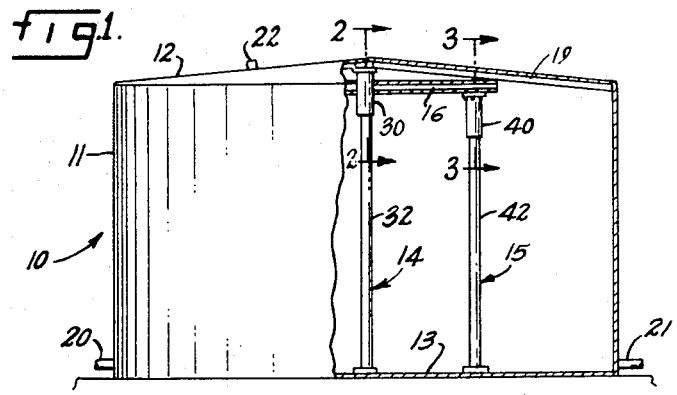
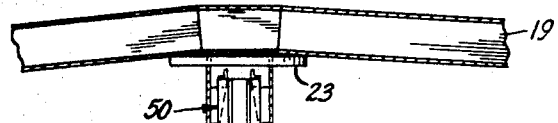
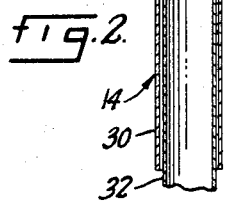
fig.2.
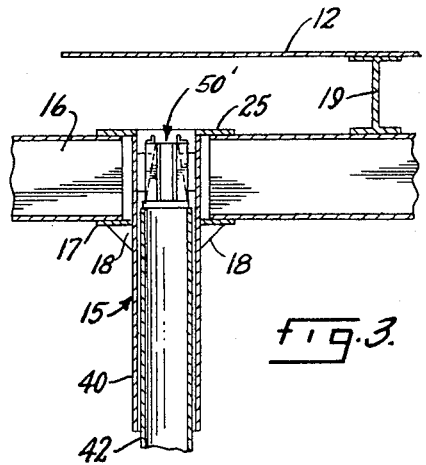
fig.3.

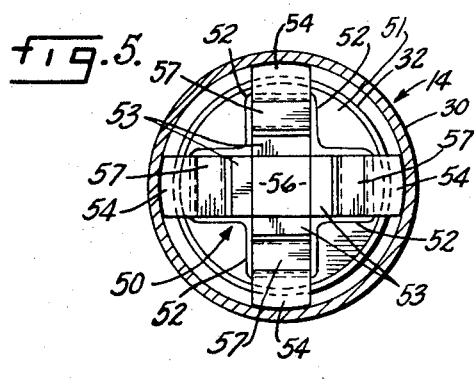
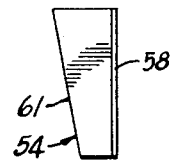
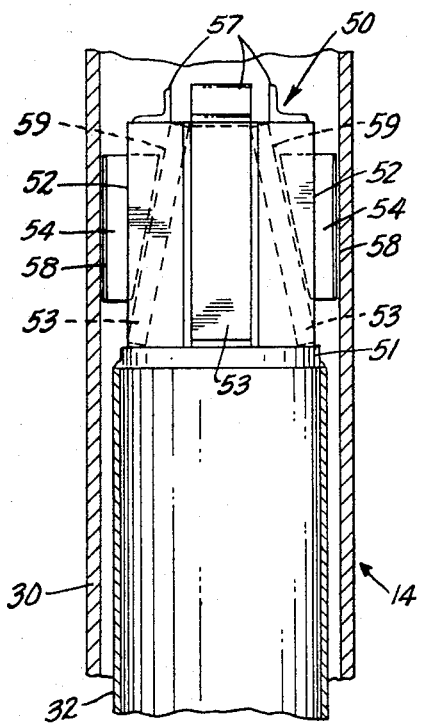
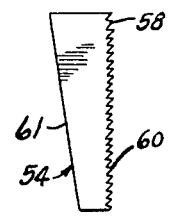

METHOD OF REMOVAL DEFORMATIONS FROM STORAGE TANK ROOF

This application is a division of our co-pending application Ser. No. 45,165, filed June 10, 1970.

BACKGROUND OF THE INVENTION

This invention relates in general to storage tanks of the fixed roof type. It deals more particularly with a method and apparatus for the removal of deformations from the roof of a storage tank, having internal support columns, caused by subsidence of the foundation.

Many tanks are designed to be supported by an appropriate number of internal vertical columns. Such tanks are widely employed to store various fluid materials, and particularly oil, gasoline and other liquid petroleum materials. This type of construction can be used to make comparatively large tanks at a considerably lower cost than similar size tanks having truss roofs free of internal column supports.

These tanks are satisfactory so long as there is no substantial differential subsidence of the load bearing support beneath the columns. When the columns settle to a differential degree, stresses are caused in the roof and deformation can take place with possible serious damage to the roof structure. These deformations, or dimples, in the roof structure accumulate rain water and other material therein, thus adding to the weight of the roof thereby causing additional subsidence of the foundation beneath the columns and, further, detract from the external appearance of the tank.

Heretofore, to remove the above-mentioned deformations the columns have been increased in length by emptying the tank to obtain entry to the tank and apply suitable shims to the bottom of the column. This approach is inherently time-consuming. U.S. Pat. No. 3,355,052 deals with this problem by providing a vertically adjustable support means connecting the roof structure to the upper end of the column. This approach requires personnel to climb to the roof of the tank to mechanically adjust the support means, which is inherently hazardous.

SUMMARY OF THE INVENTION

It is therefore an object of the present invention to provide a method and apparatus to remove deformations from the roof of a tank that is virtually automatic.

Another object is to provide a method and apparatus to remove deformations from the roof of a tank that is simple and not hazardous to personnel.

A further object of the invention is to provide a method and apparatus to remove deformations from the roof of a tank without the need of personnel mechanically adjusting the length of the columns from atop the roof.

There is accordingly provided by this invention a method for removing deformations from a roof structure of a storage tank, comprising the steps of: (a) introducing a commodity into the tank creating an upward force against the underside of the roof structure thereby increasing the length of the columns: and (b) removing the upward force while retaining the columns in their increased length.

This invention further provides apparatus that permits extension of the length of the columns when the roof structure rises, but prevents a decrease in the length of the columns should the roof structure want to fall. This apparatus includes: a tubular sleeve depending from the underside of the roof structure; an upstanding column partially positioned within, and spaced from, the sleeve member; a plurality of inclined plane surfaces, supported atop the column within the sleeve, inclined upwardly and inwardly toward the center of the sleeve; and a plurality of wedge shaped members positioned so as to frictionally contact the inner surface of the sleeve member and the inclined surfaces thereby allowing upward movement of the roof structure and preventing downward movement of the roof structure.

DESCRIPTION OF THE DRAWINGS

With these and other objects in view, as will hereinafter more fully appear, and which will be more particuarly pointed out in the appended claims, reference is now made to the following description taken in connection with the accompanying drawings in which:

FIG. 1 is a side elevation view, partially broken away, of a storage tank with adjustable columns supporting the roof;

FIG. 2 is a sectional view taken along the line 2—2 of FIG. 1;

FIG. 3 is a sectional view taken along the line 3—3 of FIG. 1;

FIG. 4 is an enlarged partial sectional view showing the internal structure of the column adjustment means of FIG. 2;

FIG. 5 is a plan view of the column adjustment means of FIG. 4;

FIG. 6 is an elevational view of the wedged-shaped member of the column adjustment means;

FIG. 7 is a plan view of the wedge-shaped member of FIG. 6; and

FIG. 8 is an elevational view of an alternate embodiment of the wedge-shaped member.

DESCRIPTION OF THE PREFERRED EMBODIMENTS

FIG. 1 shows cone roofed tank 10 having side wall 11, cone roof 12, bottom plate 13, inlet 20, outlet 21 and pressure relief valve 22. Roof 12 is supported about its periphery on the upper edge of wall 11. In addition, the roof is supported by central column 14 and a plurality of essentially identical columns 15 (one shown) positioned in a ring about central column 14. Columns 14 and 15 are welded at their bottom ends to bottom plate 13. Girders 16 extend between adjacent columns 15 and are welded or bolted at their ends to support plates 17, attached to gussets 18. Rafters 19 are welded or bolted at their inner ends to support ring 23, fixed atop of columns 14, and at their outer ends to a ring (not shown) adjacent the upper inside edge of tank wall 11. The bottom surfaces of rafters 19 are welded to the upper surfaces of girders 16 and the top surfaces of rafters 19 are welded to the underside of roof 12. The described arrangement of supporting columns, girders and rafters differs from conventional cone roof tanks in that rafters 19 are welded to roof 12 and girders 16, thereby, allowing roof 12, rafters 19, girders 16, and columns 14 and 15 to move up and down as a unit. This, as will hereinafter become more apparent, is an important feature of the present invention.

As seen in FIGS. 1 and 2 central column 14 comprises sleeve member 30 and tubular member 32 in a telescoping relationship so as to permit vertical movement of sleeve 30 relative to member 32. Support ring 23 is afixed atop of sleeve 30. Positioned within sleeve 30, and atop of member 32, is securing means 50 which selectively locks sleeve 30 to member 32 so as to permit upward movement of sleeve 30 relative to member 32 and prevent downward movement of sleeve 30 relative to member 32. The specific structure of securing means 50 will hereinafter be discussed in greater detail.

FIGS. 1 and 3 show column 15 having a sleeve member 40 and a tubular member 42 in a telescoping relationship so as to permit vertical movement of sleeve 40 relative to member 42. Gussets 18 and support plates 17 are attached to sleeve 40 to support girder 16. Plates 25, attached to sleeve 40 above support ring 17 sandwiches girder 16 therebetween, thereby translating any upward or downward movement of girder 16 to sleeve 40. Securing means 50', substantially identical to securing means 50, is positioned within sleeve 40, atop of member 42.

As mentioned above, differential subsidence of the load bearing support beneath columns 14 and 15 causes formation of deformations in roof 12 due to a decrease in the relative elevation of columns 14 and 15, girders 16 and rafters 19.

The present invention provides a novel method for removing these deformations from the roof. Briefly stated, an upward force is created against the underside of the roof structure, thereby raising the roof and increasing the effective length of the columns supporting the roof beneath the deformations. The force is then removed while retaining the columns in their lengthened position.

More specifically, pressure relief valve 22 on the tank roof is set at predetermined value so as to permit roof 12 to rise when the pressure is increased within tank 10, i.e., approximately one-half ounce per square inch pressure above the weight per square inch of the roof structure, comprising: roof 12, rafters 19, girders 16, sleeves 30 and 40, and all support means attached thereto. As liquid product, i.e., oil, is added to tank 10 the displaced vapor creates an upward force against the underside of roof 12. This force causes roof 12, and the rafters 19 and girders 16 attached thereto, to rise at the areas where roof 12 is deformed, thereby increasing the length of columns 14 and/or 15 supporting such areas. Securing means 50 and 50' permit columns 14 and 15 respectvely, to increase in length, but prevent them from decreasing in length. Therefore, as liquid is added to the tank columns 14 or 15 beneath the deformed area of the roof will automatically increase in length and retain that increased length after the liquid is removed from the tank. Thus, everytime that liquid product is added to the tank any deformations in the roof will be automatically eliminated.

A first alternative method of raising the roof to remove deformations therein, involves addition of compressed gas into the tank. With pressure relief valve 22 set as in the first method, a compressed gas, i.e., air or nitrogen, is introduced into tank 10 through inlet 20, or any other appropriate inlet. An upward force is thereby created against the underside of roof 12. This force causes roof 12, and the rafters 19 and girders 16 attached thereto, to rise at the areas where it is deformed resulting in an increase in length of columns 14 and/or 15 supporting the roof at these deformed areas. The compressed gas is then removed from the tank while retaining the columns in their increased length, thus not allowing the roof to return to its deformed position. Securing means 50 and 50' ensure the retention of the increased column length.

A second alternative method uses the vapor pressure, resulting from daily temperature variations, to create the upward force against the underside of roof 12. This force causes roof 12, and rafters 19 and girders 16 attached thereto, to rise at the areas where it is deformed resulting in an increase in length of columns 14 and/or 15 supporting the roof at these deformed areas. As the vapor pressure dissipates securing means 50 and 50' ensure the retention of the increased column length.

The removal of deformations from the roof of a storage tank by use of the above-mentioned methods is virtually automatic and does not require personnel climbing to the top of the roof to mechanically adjust the length of the columns.

This invention utilizes the fundamental law of friction:

$$F = fN$$

where $F =$ the force necessary to start one object sliding along another $f =$ the coefficient of starting friction, and $N =$ the normal force tending to keep the objects from sliding.

The length of column 14 is adjustable due to the positioning of sleeve 30 around tubular member 32 and the placing of a friction bearing, such as securing means 50 in the annular space between sleeve 30 and member 32. When sleeve 30 is rising, the force $N$ is minimal, allowing free movement of the sleeve. Means 50 is designed so $f$ is also small. When the desired elevation is reached, however, means 50 is designed so that both $N$ and $f$ increase substantially to resist and increase the gravity inspired force $F$ which would be required to drop the sleeve and roof back below the desired elevation.

Securing means 50 includes circular plate 51 welded atop of tubular member 32 to support most of the structural elements. Angle irons 52 are welded to plate 51 and positioned about the inner periphery of sleeve 30 so as to form a "cross-shaped" area 56, as seen in FIG. 5. Plates 53, inclined upwardly and inwardly toward the center line of sleeve 30 are positioned within the four leg portions of area 56. Plates 53 are welded at their bottom ends to plate 51 and at their top ends to members 57, thus forming a rigid structure defining four inclined plane surfaces 59. On each of the plane surfaces 59 travles a frictional wedge-shaped member 54 having a rounded outer surface 58 in frictional contact with the inside of sleeve 30 and an inner surface 61 in contact with surface 59. Wedges 54 and sleeve 30 are designed so that the coefficient of starting friction $f$ is a maximum at the contact surfaces between the inner surface of sleeve 30 and the rounded surface 58 of wedge 54, and so that $f$ is a minimum at the contact surface between inner surface 61 of wedge 54 and inclined plane surface 59.

The inner surface of sleeve 30 and the outer surface 58 of wedges 54 could be sandblasted so as to increase the force $f$, thereby, preventing slipping of sleeve 30 in a downward direction. Also, by greasing surfaces 59 of inclined plates 53 the upward force $F$ required to raise sleeve 30 can be reduced.

In operation, as an upward force is exerted against the underside of roof 12 sleeve 30 will move upward since $f$ between sleeve 30 and wedge 54 for upward movement is small and, therefore, the force $F$ required to move sleeve 30 upward is small. But, if after the desired level is reached, sleeve 30 wants to settle back down due to the weight of the roof structure above, it is held up because of the increased force "F" required to start sleeve 30 downward resulting from the increased $f$ against downward movement and the increased normal force $N$ caused by the contact of wedges 54 with the inclined plates 53. Thus, securing means 50 permits upward movement of sleeve 30 and the roof structure attached thereto and prevents downward movement of sleeve 30 and the roof structure attached thereto.

FIG. 8 shows an alternative embodiment of wedge 54 having teeth 60 machined into rounded surface 58. This increases $f$ between the inside of sleeve 30 and surfaces 58 preventing downward movement of sleeve 30.

In summary, the present invention provides a method for automatic removal of deformations from a column supported roof of a storage tank caused by subsidence of the load bearing support beneath the columns. In addition novel apparatus to practice the method is disclosed which includes specific roof structure and column adjustment means.

It should be understood, of course, that the foregoing disclosure relates to only preferred embodiments of the invention and that numerous modifications or alternatives may be made therein without departing from the spirit and the scope of the invention as set forth in the appended claims.

What is claimed is:

1. A method for removing deformations from a roof of a storage tank having a bottom, a side wall, a roof structure and plurality of columns of vertically adjustable length within said tank supporting said roof structure above said bottom; said method comprising:
   a. creating an upward force against the underside of said roof structure thereby raising at least a portion of said roof structure and increasing the length of at least one of said columns; and
   b. removing said upward force while retaining said columns in their increased length.

2. A method for removing deformations from a roof of a storage tank having a bottom, a side wall, a roof structure and a plurality of columns of vertically adjustable length within said tank supporting said roof structure above said bottom; caused by subsidence of the foundation of at least one of said columns resulting in a decrease in the effective elevation of the columns; said method comprising:
   a. creating an upward force against the underside of said roof structure thereby raising at least a portion of said roof structure and increasing the length of the columns having a decreased effective elevation; and
   b. removing said upward force while retaining the columns in their increased length.

3. A method for removing deformations from a roof of a storage tank having a bottom, a side wall, a roof structure and a plurality of columns of vertically adjustable length within said tank supporting said roof structure above said bottom, said deformations being caused by subsidence of the foundation of at least one of said columns resulting in a decrease in the effective elevation of the columns; said method comprising:
   a. creating an upward force against the underside of said roof structure by introducing a commodity into the tank thereby increasing the pressure within the tank and thereby raising at least a portion of said roof structure and increasing the length of the columns having a decreased effective elevation; and
   b. removing said upward force while retaining the columns in their increased length.

4. The method of claim 3 wherein said commodity is a compressed gas.

5. The method of claim 3 wherein said commodity is a vaporizable product being stored within the tank, thereby increasing the pressure within the tank due to the displaced vapor.

6. A method for removing deformations from a roof of a storage tank having a bottom, a side wall, a roof structure, a plurality of columns of vertically adjustable length within said tank supporting said roof structure above said bottom, and a pressure relief valve; said deformations caused by subsidence of the foundation of at least one of said columns resulting in a decrease in the effective elevation of the columns; said method comprising:
   a. setting the relief pressure of said valve above the weight per square inch of said roof structure;
   b. introducing a commodity into the tank creating an upward force against the underside of said roof structure, thereby increasing the length of the columns having decreased effective elevation; and
   c. retaining said columns in their increased length upon removal of said commodity.

7. The method of claim 6 wherein said commodity is a vaporizable product being stored in said tank, and the displaced vapor creates said upward force.

8. The method of claim 6 wherein said commodity is a compressed gas.

* * * * *